US009278887B1

(12) United States Patent
Tuan et al.

(10) Patent No.: US 9,278,887 B1
(45) Date of Patent: *Mar. 8, 2016

(54) CONCRETE MIX FOR ELECTROMAGNETIC WAVE/PULSE SHIELDING

(71) Applicant: The Board of Regents of the University of Nebraska, Lincoln, NE (US)

(72) Inventors: Christopher Tuan, Omaha, NE (US); Lim Nguyen, Bellevue, NE (US)

(73) Assignee: The Board of Regents of the University of Nebraska, Lincoln, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/607,594

(22) Filed: Jan. 28, 2015

Related U.S. Application Data

(63) Continuation of application No. 13/472,670, filed on May 16, 2012, now Pat. No. 8,968,461.

(60) Provisional application No. 61/486,351, filed on May 16, 2011.

(51) Int. Cl.
*C04B 14/22* (2006.01)
*C04B 14/24* (2006.01)
*C04B 14/48* (2006.01)
*C04B 14/02* (2006.01)
(Continued)

(52) U.S. Cl.
CPC ............ *C04B 14/022* (2013.01); *C04B 14/024* (2013.01); *C04B 14/48* (2013.01); *C04B 40/001* (2013.01); *H01B 1/16* (2013.01)

(58) Field of Classification Search
CPC .... C04B 14/022; C04B 14/024; C04B 14/48; C04B 40/001; H01B 1/16
See application file for complete search history.

(56) References Cited

U.S. PATENT DOCUMENTS 2,868,659 A 1/1959 Scripture, Jr. et al.
3,207,705 A 9/1965 Hall
(Continued)

FOREIGN PATENT DOCUMENTS

CN 101030454 9/2007
JP 06240843 8/1994
WO 0240799 5/2002

OTHER PUBLICATIONS

Notification of Transmittal of the International Search Report and the Written Opinion of the International Searching Authority—Oct. 14, 2014.

*Primary Examiner* — Paul Marcantoni
(74) *Attorney, Agent, or Firm* — Tyson B. Benson; Advent, LLP

(57) ABSTRACT

Conductive concrete mixtures are described that are configured to provide EMP shielding and reflect and/or absorb, for instance, EM waves propagating through the conductive concrete mixture. The conductive concrete mixtures include cement, aggregate, water, metallic conductive material, and conductive carbon particles and/or magnetic material. The conductive material may include steel fibers, and the magnetic material may include taconite aggregate. The conductive concrete mixture may also include graphite powder, silica fume, and/or other supplementary cementitious materials (SCM). The conductive carbon particles may comprise from about zero to twenty-five percent (0-25%) of the conductive concrete mixture by weight and/or the magnetic material may comprise from about zero to fifty percent (0-50%) of the conductive concrete mixture by weight.

19 Claims, 4 Drawing Sheets

(51) Int. Cl.
 *C04B 40/00* (2006.01)
 *H01B 1/16* (2006.01)

(56) References Cited

U.S. PATENT DOCUMENTS

| | | |
|---|---|---|
| 5,346,547 A | 9/1994 | McCormack |
| 5,422,174 A | 6/1995 | Shintani et al. |
| 6,214,454 B1 | 4/2001 | Kanda et al. |
| 6,503,318 B2 | 1/2003 | Pye et al. |
| 6,821,336 B1 | 11/2004 | Ramme et al. |
| 7,578,881 B2 | 8/2009 | Ramme |
| 8,067,084 B2 | 11/2011 | Yoshikawa et al. |
| 8,617,309 B1 | 12/2013 | Carney et al. |
| 2002/0162484 A1 | 11/2002 | Ramme et al. |
| 2012/0227630 A1 | 9/2012 | Gray |
| 2012/0324811 A1 | 12/2012 | Kawase et al. |

CONCRETE MIX FOR ELECTROMAGNETIC WAVE/PULSE SHIELDING

CROSS-REFERENCE TO RELATED APPLICATIONS

The present application is a continuation under 35 U.S.C. §120 of U.S. patent application Ser. No. 13/472,670, filed May 16, 2012, entitled "Concrete Mix for Electromagnetic Wave/Pulse Shielding," which is hereby incorporated by reference in its entirety.

FEDERALLY SPONSORED RESEARCH OR DEVELOPMENT

This invention was made with government support under contract HDTRA1-10-P-0060 to support the United States Strategic Command (STRATCOM) awarded by the United States Defense Threat Reduction Agency (DTRA). The government has certain rights in the invention.

BACKGROUND

An Electromagnetic Pulse (EMP) is an abrupt pulse or burst of electromagnetic (EM) radiation that typically results from a high energy explosion (e.g., a nuclear explosion) or from a suddenly fluctuating magnetic field, such as a magnetic field generated by a solar flare or coronal mass ejection (CME). An EMP creates rapidly changing electric fields and magnetic fields, which may couple with electrical and electronic systems, resulting in damaging current and voltage surges. For example, a High-altitude Electromagnetic Pulse (HEMP) is produced when a nuclear weapon is detonated high above the Earth's surface, generating gamma radiation that ionizes the atmosphere and creates an instantaneous and intense EM field. The effects of a HEMP vary depending on a number of factors, including detonation altitude, energy yield, gamma ray output, interactions with the Earth's magnetic field, shielding effectiveness of targets, and so forth. As the EM field of a HEMP radiates outward, it can overload electronic devices and equipment with effects similar to (but causing damage more quickly than) a lightning strike. EMP weapons have also been developed that can be mounted on aircraft and carried by ground vehicles.

SUMMARY

Conductive concrete mixtures are described that are configured to provide EMP shielding and reflect and/or absorb, for instance, EM waves propagating through the conductive concrete mixture. The conductive concrete mixtures include cement, aggregate, water, metallic conductive material, and conductive carbon particles and/or magnetic material. The metallic conductive material may include steel fibers, and the magnetic material may include taconite aggregate. The conductive concrete mixture may also include graphite powder, silica fume, and/or other supplementary cementitious materials (SCM) such as fly ash, calcined clay, and ground granular blast furnace slag (GGBFS). The conductive carbon particles may comprise from about zero to twenty-five percent (0-25%) of the conductive concrete mixture by weight and/or the magnetic material may comprise from about zero to fifty percent (0-50%) of the conductive concrete mixture by weight. In implementations, the conductive carbon particles may comprise from about fifteen to twenty percent (15-20%) of the conductive concrete mixture by weight. The magnetic material may comprise from about twenty to forty-five percent (20-45%) of the conductive concrete mixture by weight.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

DETAILED DESCRIPTION

Overview

Figure 1:
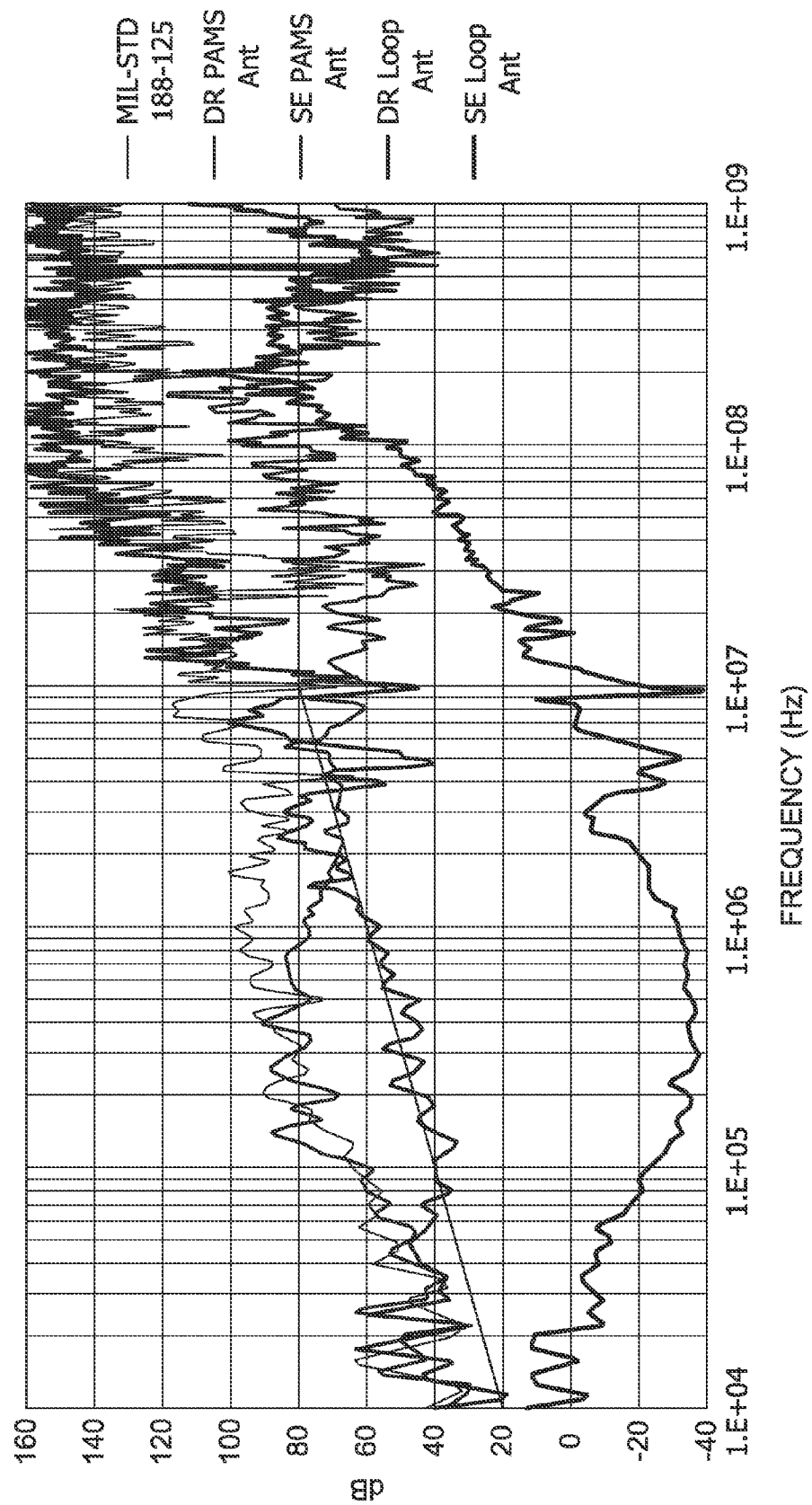
FIG. 1 is a graph illustrating the relative attenuation of a three-inch (3 in.) thick dome constructed using a conductive concrete mixture in accordance with example implementations of the present disclosure.
Figure 2:
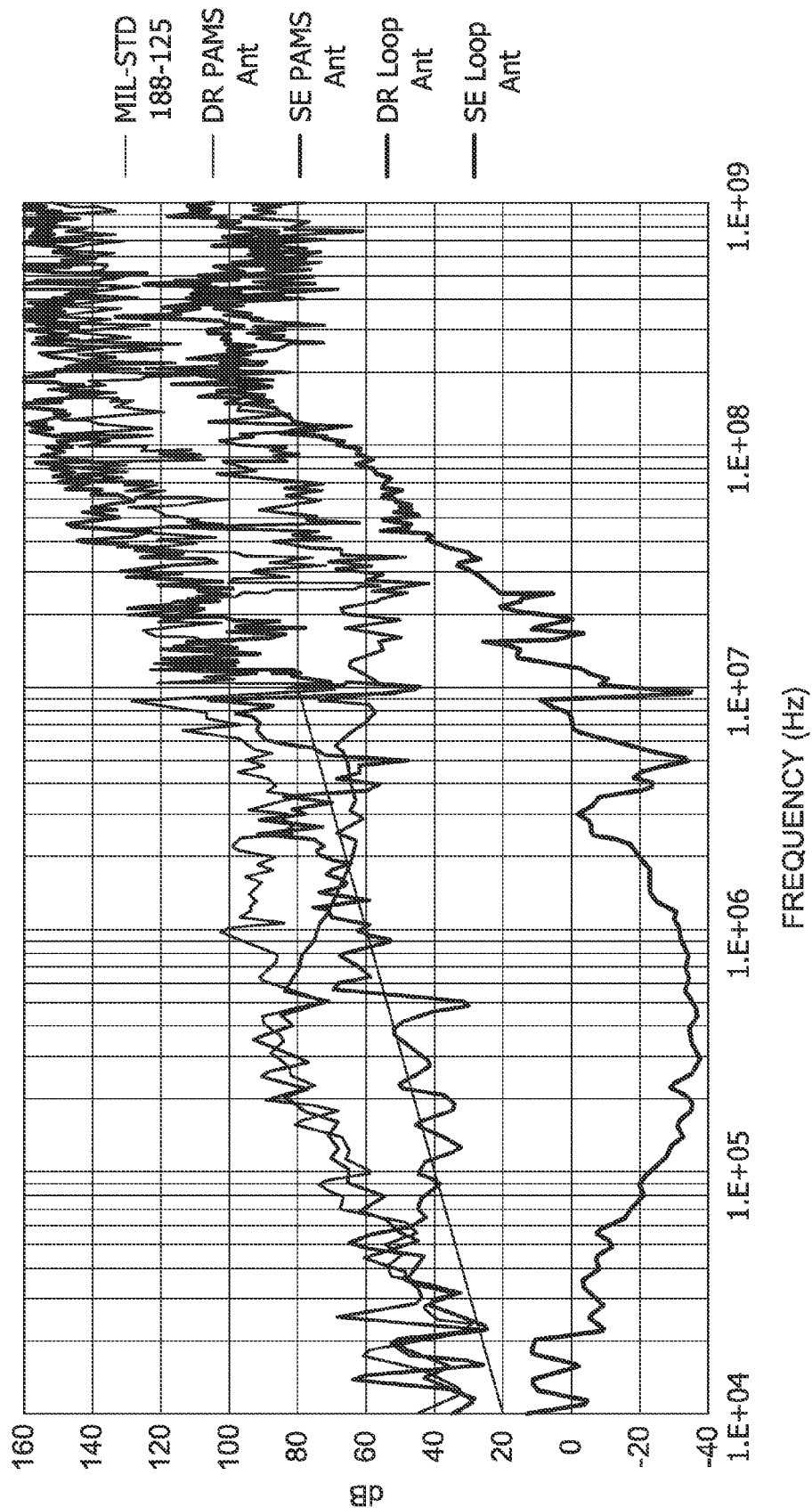
FIG. 2 is a graph illustrating the relative attenuation of a six-inch (6 in.) thick dome constructed using a conductive concrete mixture in accordance with example implementations of the present disclosure.
Figure 3:
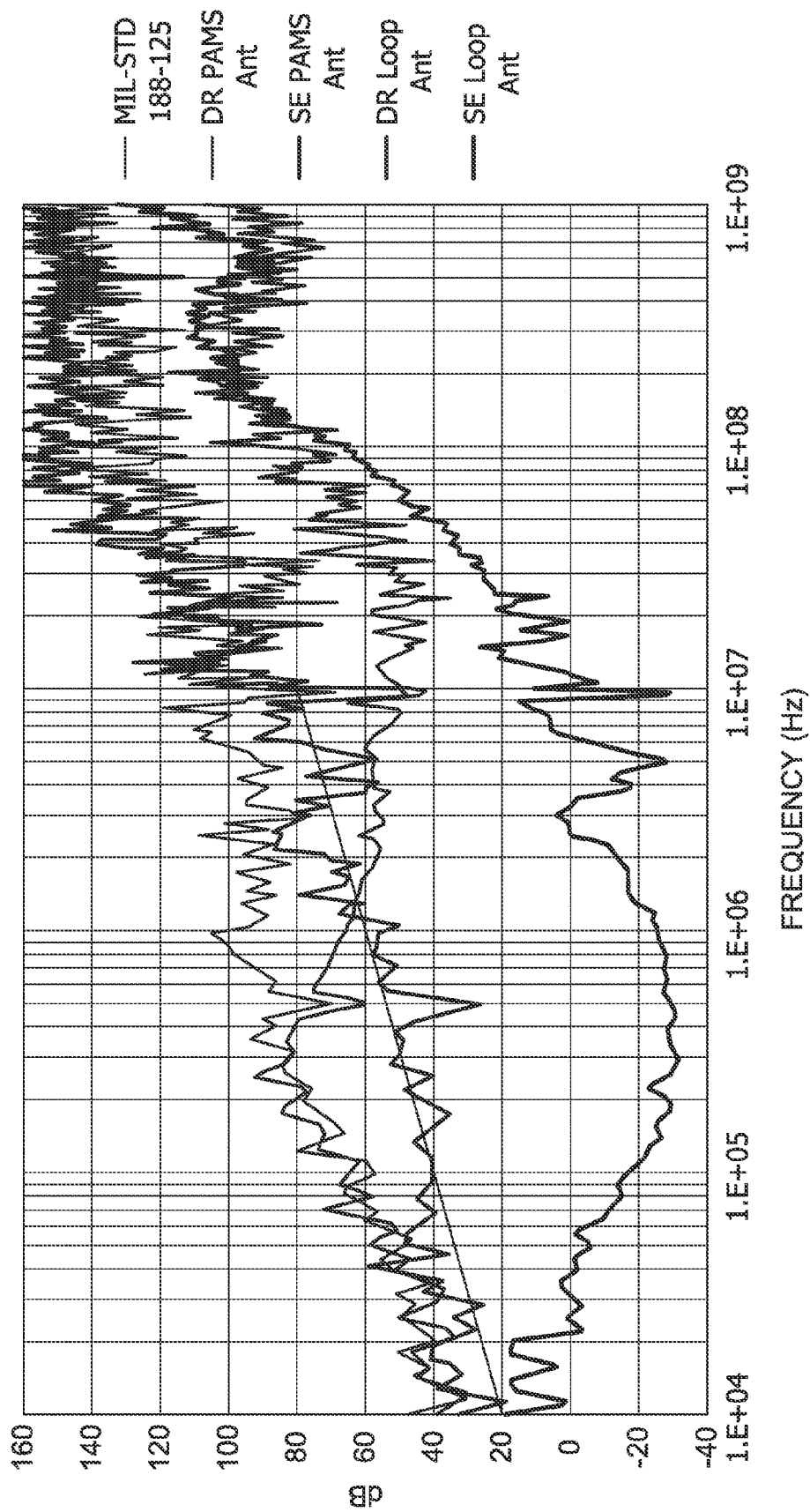
FIG. 3 is a graph illustrating the relative attenuation of a twelve-inch (12 in.) thick dome constructed using a conductive concrete mixture in accordance with example implementations of the present disclosure.

EMP protection is desirable for facilities and infrastructure employed for critical services, such as Command and Control ($C^2$), Command and Control Information Systems ($C^2IS$), Command, Control, Communications, Computers, Intelligence, Surveillance, and Reconnaissance ($C^4ISR$), financial institutions, and so forth. For example, the military is concerned with ensuring that military commanders have the ability to direct forces, while financial institutions are concerned with protecting computer networks and databases crucial to electronic business (e-business). Thus, critical facilities and infrastructure are typically protected from EMP's by shielding and grounding building structures using a shielded enclosure or Faraday cage around a facility. For example, a Faraday cage can be formed as an enclosure using metallic conducting material (e.g., solid steel panels) or a mesh of conducting material (e.g., copper wire screen) surrounding a facility. However, such shielding must be constructed in addition to the facility itself, adding to the cost and complexity of providing EMP protection.

Accordingly, the present disclosure is directed to a conductive concrete building material that can provide built-in shielding against EMP, as well as EM field immunity and radiated emission security. For example, while concrete with embedded steel rebar can provide some magnetic shielding, a conductive concrete enclosure configured in accordance with the present disclosure can provide effective global shielding at frequencies of interest. Further, conductive concrete walls can also provide grounding and lightning protection, and conduct the energy of EMP induced current, which would otherwise be conducted in wires and other conductors within a structure. Additionally, use of the conductive concrete material may provide a more cost-effective building option (e.g., instead of constructing separate shielding in the manner of a Faraday cage).

In implementations, the conductive concrete mixture may include one or more magnetic materials, such as ferromagnetic material, paramagnetic material, and so forth, which serve to provide EMP shielding and absorb, for instance, EM waves propagating through the conductive concrete mixture. For example, in a specific instance, the conductive concrete mixture includes a taconite rock material that comprises magnetite, such as a taconite aggregate. However, taconite aggregate is provided by way of example only and is not meant to be restrictive of the present disclosure. Thus, in other implementations, the conductive concrete mixture may include other materials, such as, but not necessarily limited to: natural geological materials, mineral materials, and so forth. For example, the conductive concrete mixture may include meteoric iron (e.g., iron from nickel-iron meteorites) having kamacite and/or taenite minerals. The conductive concrete mixture may also include magnetite crystals produced by bacteria and/or magnetite collected from river or beach sands. Further, the conductive concrete mixture may include titanohematite and/or pyrrhotite (which may be ground into a powder). In still further instances, the conductive concrete mixture may include a paramagnetic mineral, such as ilmenite, titanomagnetite, and so forth.

The conductive concrete mixture also includes one or more conductive materials configured to furnish electrical conductivity to the concrete. The conductive material serves to provide EMP shielding and reflect and absorb, for instance, EM waves propagating through the conductive concrete mixture. For example, the conductive concrete mixture may include at least substantially uniformly distributed conductive materials, which may include metallic and possibly non-metallic conductive materials, such as metal and/or carbon fibers. In implementations, the metallic conductive material may serve to reflect EM waves, while the non-metallic conductive material may serve to absorb EM waves. For the purposes of the present disclosure, a conductive concrete mixture may be defined as a cement-based admixture containing electrically conductive components that furnish a relatively high electrical conductivity to the concrete (e.g., with respect to the electrical conductivity of typical concrete). The conductive concrete mixture may also include conductive carbon particles, such as carbon powder, and so forth, which may furnish better electrically conductive paths between portions of the conductive material, achieving, for instance, a more effective reflective-wire-mesh structure in the concrete.

In implementations, the conductive concrete mixture includes a metallic conductive material. For example, the metallic conductive material may be a steel material, such as one inch (1 in.) long steel fibers, one and one-half inch (1.5 in.) long steel fibers, fine steel fibers, steel wool fibers, steel powder, and so forth. In a particular instance, low-carbon steel fibers having aspect ratios from about eighteen to fifty-three (18-53) can be used to form the conductive concrete mixture. These fibers may be rectangular in shape and may have a deformed or corrugated surface to aid in bonding with the concrete material. However, steel fibers are provided by way of example only and are not meant to be restrictive of the present disclosure. Thus, other metallic conductive materials may also be utilized, including metal particles such as steel shavings, which may have varying diameters. Further, the conductive concrete mixture may include conductive aggregates, such as iron ore and/or slag. In some instances, copper-rich aggregates can be used. It should be noted that using conductive aggregates may reduce the amount of conductive fibers necessary to maintain stable electrical conductivity. Additionally, a chemical admixture may be added to the aggregate to enhance electrical conductivity and reduce the amount of conductive fibers.

Example Implementations

One-quarter inch (0.25 in.) thick test specimens made of cement, carbon powder, and very fine steel fibers were evaluated according to the ASTM-4935-99 Shielding Effectiveness (SE) test fixture. The measurements of the reference and load specimens were obtained using a radio frequency (RF) network analyzer. SE has been determined as the difference in decibels (dB) between the insertion loss measurements of the reference and load reference specimens. The results showed an SE better than sixty decibels (60 dB) at three hundred kilohertz (300 kHz) that decreased at ten decibels (10 dB) per decade frequency to about thirty decibels (30 dB) at three hundred megahertz (300 MHz), before improving at about ten decibels (10 dB) per decade above three hundred (300 MHz). This frequency response suggests that the SE is due to both reflection (e.g., at low frequency) and absorption (e.g., at high frequency).

One-quarter inch (0.25 in.) thick test specimens made of typical cement were also evaluated according to the ASTM-4935-99 SE test fixture. Measurements with the RF network analyzer showed an average SE of less than five decibels (5 dB) over the frequency range from three-tenths megahertz (0.3 MHz) to three gigahertz (3 GHz). Thus, it may be seen that the cement-only specimens provide essentially no shielding between one megahertz (1 MHz) and one hundred megahertz (100 MHz). In comparison, specimens that are of the same thickness but contain fine steel fibers and carbon powder may yield SE better than thirty decibels (30 dB) over the same frequency range. The comparative results of these two sample mixtures indicate the application of conductive concrete for providing electromagnetic shielding of structures. Further, the measurements from cement-only specimens can be used to provide baseline SE results for further comparison with other conductive mix designs at various thicknesses.

One-quarter inch (0.25 in.) thick specimens containing cement, taconite powder, and fine steel fibers were evaluated according to the ASTM-4935-99 SE test fixture. Measurements with the RF network analyzer showed a low frequency SE of nearly fifteen decibels (15 dB) from three-tenths megahertz (0.3 MHz) to twenty megahertz (20 MHz) that increased to about twenty-five decibels (25 dB) between two hundred megahertz (200 MHz) and seven hundred megahertz (700 MHz). The SE improved at sixty decibels (60 dB) per decade in the microwave frequency range and reached greater than fifty decibels (50 dB) at two gigahertz (2 GHz). Thus, it may be seen that the taconite and steel fiber concrete mixture possesses superior SE characteristics compared to the cement-only mixture as described above. It should be noted that the lesser SE of this mixture at low frequency as compared to the carbon powder and fine steel fiber specimens may be attributable to the role of carbon powder versus taconite in providing electrically conductive paths between random steel fibers to achieve a more effective, reflective wire mesh-like structure in the concrete. The SE improvement in the microwave frequency range in the same comparison demonstrates the enhanced effectiveness of taconites as microwave absorbing aggregates. These results also show that the taconite specimens can absorb some electromagnetic energy at lower frequency, indicating that the conductive concrete mixture can also provide low frequency magnetic shielding.

One cubic yard of a conductive concrete mixture in accordance with the present disclosure may be formulated as follows:

| Material | Pounds | Percent |
| --- | --- | --- |
| Type I cement | 778.4 | 20.9% |
| Silica fume | 40.9 | 1.1% |
| Sand and gravel/taconite sand | 749.1 | 20.1% |
| Taconite aggregate | 875.2 | 23.5% |
| Carbon particles (0.7 mm max particle size) | 75.2 | 2.0% |
| Carbon particles (2 mm max particle size) | 209.4 | 5.6% |
| Carbon particles (10 mm max particle size) | 299.3 | 8.0% |
| Graphite powder (0.15 mm max particle size) | 45.9 | 1.2% |
| Water | 374.2 | 10.1% |
| Steel fiber (1 in.) | 121.5 | 3.3% |
| Steel fiber (1.5 in.) | 99.5 | 2.7% |
| Steel fiber (fine)/steel shavings | 38.6 | 1.0% |
| Superplasticizer/High range water reducer | 13.7 | 0.4% |

A conductive concrete mixture formulated as described may have mechanical strength characteristics such as a twenty-eight (28) day compressive strength ranging from about four thousand five hundred to seven thousand pounds per square inch (4,500-7,000 psi), and a flexural strength ranging from about nine hundred to one thousand five hundred pounds per square inch (900-1,500 psi). In implementations, the purity of the conductive carbon particles and graphite particles is at least ninety-six percent (96%). It should be noted that the specific amounts described above are provided by way of example only and are not meant to be restrictive of the present disclosure. Thus, other amounts of material may be used for a specified SE in accordance with the present disclosure. For example, cement may comprise from about eighteen to twenty-one percent (18-21%) of the conductive concrete mixture by weight; silica fume may comprise from about nine-tenths to one and one-tenth percent (0.9-1.1%) of the conductive concrete mixture by weight; fine aggregate/sand may comprise from about eighteen to twenty and one-tenth percent (18-20.1%) of the conductive concrete mixture by weight; taconite aggregate may comprise from about twenty to twenty-five percent (20-25%) of the conductive concrete mixture by weight; conductive carbon particles may comprise from about twelve and one-half to sixteen percent (12.5-16%) of the conductive concrete mixture by weight; graphite powder may comprise from about nine-tenths to one and two-tenths percent (0.9-1.2%) of the conductive concrete mixture by weight; water may comprise from about nine to ten and one-half percent (9-10.5%) of the conductive concrete mixture by weight; steel fibers may comprise from about one to seven percent (1-7%) of the conductive concrete mixture by weight; and superplasticizer may comprise from about three-tenths to four-tenths percent (0.3-0.4%) of the conductive concrete mixture by weight.

Further, the amounts of materials having different particle sizes may vary as well. For example, in implementations, conductive carbon particles having a maximum particle size of seven-tenths of a millimeter (0.7 mm) may comprise from about one-half to two percent (0.5-2%) of the conductive concrete mixture by weight; conductive carbon particles having a maximum particle size of two millimeters (2 mm) may comprise from about two to six percent (2-6%) of the conductive concrete mixture by weight; conductive carbon particles having a maximum particle size of ten millimeters (10 mm) may comprise from about seven to fourteen percent (7-14%) of the conductive concrete mixture by weight; graphite powder having a maximum particle size of fifteen-one-hundredths of a millimeter (0.15 mm) may comprise from about one to one and one-half percent (1-1.5%) of the conductive concrete mixture by weight; one inch (1 in.) long steel fibers may comprise from about three to three and three-tenths percent (3.0-3.3%) of the conductive concrete mixture by weight; one-half inch (1.5 in.) long steel fibers may comprise from about two and one-half to three percent (2.5-3%) of the conductive concrete mixture by weight; and fine steel fiber may comprise from about zero to two percent (0-2%) of the conductive concrete mixture by weight.

Example Process

Figure 4:
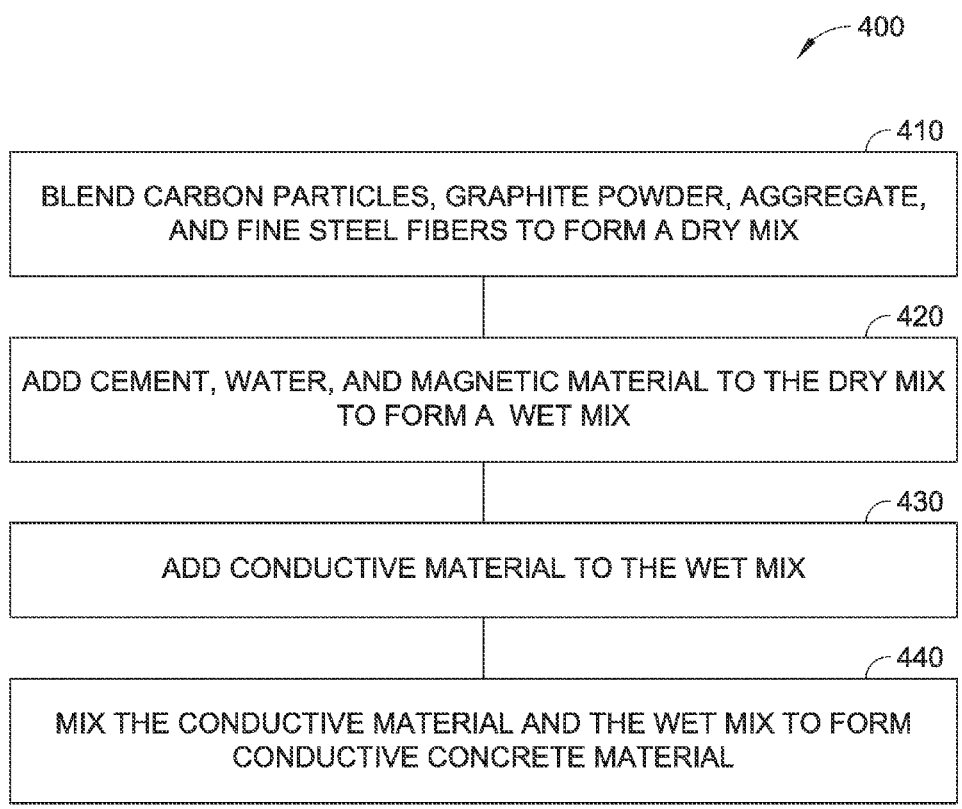
FIG. 4 is a flow diagram illustrating a method for making a conductive concrete mixture in accordance with example implementations of the present disclosure.

Referring now to FIG. 4, example techniques for making a conductive concrete mixture are described. FIG. 4 depicts a process 400, in an example implementation, for making a conductive concrete mixture using, for instance, metallic conductive material, conductive carbon particles, and magnetic material, such as taconite aggregate, as described above.

In the process 400 illustrated, conductive carbon particles, graphite powder, aggregate, such as sand and gravel, and fine steel fibers are blended to form a dry mix (Block 410). In implementations, the materials may be blended in a container such as the drum of a concrete truck mixer, and so forth. However, a concrete truck mixer is provided by way of example only, and other containers for mixing concrete may also be used. In a specific instance, the materials of the dry mix are mixed for at least five (5) minutes. Next, cement (e.g., Type I cement), water, and a magnetic material, such as crushed taconite aggregate, are added to the dry mix to form a wet mix (Block 420). Silica fume, other SCM, and/or an admixture, such as superplasticizer (water reducer/High Range Water Reducer (HRWR)) can also be added to the wet mix. In implementations, the wet mix is formed at the concrete truck.

Then, metallic conductive material, such as steel fiber, is added to the wet mix (Block 430). For example, steel fibers can be added in the truck mixer using, for instance, a conveyor (e.g., conveyor belt) extending into the truck mixer. In implementations, the steel fibers are spread out to at least substantially uniformly distribute the steel fibers on the conveyor (e.g., to avoid flocculation or balling of the steel fibers). For example, the steel fibers can be placed on a conveyor belt by hand. Next, conductive material, such as one inch (1 in.) long steel fibers, and one and one-half inch (1.5 in.) long steel fibers, is mixed with the wet mix to form a conductive concrete mixture (Block 440).

It should be noted that while process 400 describes adding the metallic conductive material to the wet concrete mixture, the metallic conductive material may be added during the mixing of cement and/or aggregate in either wet or dry conditions. Further, it is desirable to maintain at least substantially uniform disbursement of the metallic conductive material during mixing. Thus, mixing may be performed according to guidelines specified by, for example, American Concrete Institute (ACI) Committee 544 for mixing steel fibers. U.S. Pat. No. 6,825,444, issued Nov. 30, 2004, entitled "Heated Bridge Deck System and Materials and Method for Constructing the Same" includes example mixing procedures that can be used with the conductive concrete mixture of the present disclosure and is incorporated herein by reference in its entirety.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A concrete mixture, comprising:
   cement;
   aggregate;
   water;
   metallic conductive material; and
   an electromagnetic shielding material comprising conductive carbon particles comprising from at least about one to twenty percent (1-20%) of the concrete mixture by weight and magnetic material comprising from about fifteen to fifty percent (15-50%) of the concrete mixture by weight.

2. The concrete mixture as recited in claim 1, wherein the metallic conductive material comprises steel fibers.

3. The concrete mixture as recited in claim 1, wherein the magnetic material comprises at least one of taconite, magnetite, kamacite, taenite, titanohematite, pyrrhotite, ilmenite, or titanomagnetite.

4. The concrete mixture as recited in claim 1, wherein the magnetic material comprises taconite aggregate.

5. The concrete mixture as recited in claim 1, further comprising graphite powder.

6. The concrete mixture as recited in claim 1, further comprising a supplementary cementitious material (SCM).

7. The concrete mixture as recited in claim 1, wherein the metallic conductive material comprises from at least about one to twenty-five percent (1-25%) of the concrete mixture by weight.

8. A method of making a concrete mixture, comprising:
   blending conductive carbon particles and aggregate to a form a dry mix;
   adding cement, water, and magnetic material to the dry mix to form a wet mix;
   adding metallic conductive material to the wet mix; and
   mixing the conductive material and the wet mix to form a conductive concrete material,
   wherein the conductive carbon particles comprise from at least about one to twenty percent (1-20%) of the concrete mixture by weight and the magnetic material comprises from about fifteen to fifty percent (15-50%) of the concrete mixture by weight.

9. The method as recited in claim 8, wherein the metallic conductive material comprises steel fibers.

10. The method as recited in claim 8, wherein the magnetic material comprises at least one of taconite, magnetite, kamacite, taenite, titanohematite, pyrrhotite, ilmenite, or titanomagnetite.

11. The method as recited in claim 8, wherein the magnetic material comprises taconite aggregate.

12. The method as recited in claim 8, wherein blending conductive carbon particles and aggregate to form a dry mix further comprises blending conductive carbon particles, graphite powder, and aggregate to form a dry mix.

13. The concrete mixture as recited in claim 8, wherein adding cement, water, and magnetic material to the dry mix to form a wet mix further comprises adding cement, water, magnetic material, and a supplementary cementitious material (SCM) to the dry mix to form a wet mix.

14. A concrete mixture, comprising:
   cement;
   aggregate;
   water;
   metallic conductive material;
   conductive carbon particles; and
   magnetic material.

15. The concrete mixture as recited in claim 14, wherein the metallic conductive material comprises steel fibers.

16. The concrete mixture as recited in claim 14, wherein the magnetic material comprises at least one of taconite, magnetite, kamacite, taenite, titanohematite, pyrrhotite, ilmenite, or titanomagnetite.

17. The concrete mixture as recited in claim 14, wherein the magnetic material comprises taconite aggregate.

18. The concrete mixture as recited in claim 14, further comprising graphite powder.

19. The concrete mixture as recited in claim 14, further comprising a supplementary cementitious material (SCM).

* * * * *